United States Patent
Lin et al.

(10) Patent No.: US 10,461,808 B2
(45) Date of Patent: Oct. 29, 2019

(54) SIGNAL TRANSMISSION ASSEMBLY

(71) Applicant: ASUSTeK COMPUTER INC., Taipei (TW)

(72) Inventors: Hank Lin, Taipei (TW); Bin-Chyi Tseng, Taipei (TW); Tsung-Chieh Yen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/132,604

(22) Filed: Sep. 17, 2018

(65) Prior Publication Data

US 2019/0089410 A1     Mar. 21, 2019

(30) Foreign Application Priority Data

Sep. 21, 2017    (TW) .............................. 106132470 A

(51) Int. Cl.
    *H04B 3/54*       (2006.01)
    *H04B 3/06*       (2006.01)

(52) U.S. Cl.
    CPC .................. *H04B 3/54* (2013.01); *H04B 3/06* (2013.01)

(58) Field of Classification Search
    CPC ...................................... H04B 3/54; H04B 3/06
    See application file for complete search history.

(56) References Cited

U.S. PATENT DOCUMENTS

| | | | |
|---|---|---|---|
| 7,397,320 B1* | 7/2008 | Bokhari | H01P 3/081 333/1 |
| 2007/0040628 A1* | 2/2007 | Kanno | H01P 3/02 333/4 |
| 2008/0240656 A1* | 10/2008 | Rollin | H01P 3/06 385/50 |
| 2011/0273240 A1* | 11/2011 | Lin | H05K 1/0245 333/4 |
| 2013/0098661 A1* | 4/2013 | Lin | G06F 17/5068 174/250 |
| 2014/0341581 A1* | 11/2014 | Lent | H04B 3/32 398/79 |
| 2016/0065391 A1* | 3/2016 | Ao | H04L 25/0278 375/257 |
| 2017/0062893 A1* | 3/2017 | Wu | H01P 3/08 |

* cited by examiner

*Primary Examiner* — Brandon J Miller
(74) *Attorney, Agent, or Firm* — McClure, Qualey & Rodack, LLP

(57) ABSTRACT

A signal transmission assembly includes a substrate, a first transmission line, and a second transmission line. The first transmission line and the second transmission line are disposed on the substrate and extending along a first direction. The first transmission line comprises at least one first transmission section and at least one second transmission section. The first transmission section is apart from the second transmission line by a first distance. The second transmission section is apart from the second transmission line by a second distance. The first distance is greater than or equal to the second distance. A first edge of the first transmission section and a second edge of the second transmission section are proximal to the second transmission line and parallel to the first direction, and the second transmission line does not contact an edge extension line extending from the second edge along the first direction.

12 Claims, 3 Drawing Sheets

SIGNAL TRANSMISSION ASSEMBLY

CROSS-REFERENCE TO RELATED APPLICATION

This application claims the priority benefit of Taiwan application serial No. 106132470, filed on Sep. 21, 2017. The entirety of the above-mentioned patent application is hereby incorporated by reference herein and made apart of the specification.

BACKGROUND OF THE INVENTION

Field of the Invention

The invention relates to a signal transmission assembly.

Description of the Related Art

In recent years, in digital systems, with improvement of signal transmission rates and reduction of outer sizes of electronic products, electronic circuits are designed to be denser. Therefore, crosstalk phenomena between circuits are severer. The so-called crosstalk results from that when being transmitted in a transmission channel, a signal exerts an impact on a neighboring transmission line because of electromagnetic coupling, and a coupling voltage and a coupling current are generated on the interfered transmission line. Excessive crosstalk would affect efficiency of running of a system, and even causes abnormal triggering of a circuit, and therefore, the system cannot run normally.

BRIEF SUMMARY OF THE INVENTION

According to one aspect, a signal transmission assembly is provided herein. The signal transmission assembly includes a substrate, a first transmission line, and a second transmission line. The first transmission line is disposed on the substrate, extending along a first direction, and comprising at least one first transmission section and at least one second transmission section. The second transmission line is disposed on the substrate and extending along the first direction, wherein the first transmission section is apart from the second transmission line by a first distance, the second transmission section is apart from the second transmission line by a second distance, and the first distance is greater than or equal to the second distance. A first edge of the first transmission section is proximal to the second transmission line and parallel to the first direction, and a second edge of the second transmission section is also proximal to the second transmission line and parallel to the first direction, and the second transmission line is not in contact with an edge extension line extending from the second edge along the first direction.

In the signal transmission assembly of the disclosure, each of the first transmission section of the first transmission line has a side which is proximal to the second transmission line 14 and the side of the first transmission section has a cave away from the second transmission line or each of the third transmission sections of the second transmission line has a side which is proximal to the first transmission line and the side of the third transmission section has a cave away from the first transmission line, so that the distance between the first transmission line and the second transmission line is increased to reduce the voltage coupling or the current coupling between the first transmission line and the second transmission line, thereby reducing crosstalk phenomena between the transmission lines.

DETAILED DESCRIPTION OF THE EMBODIMENTS

Figure 1:
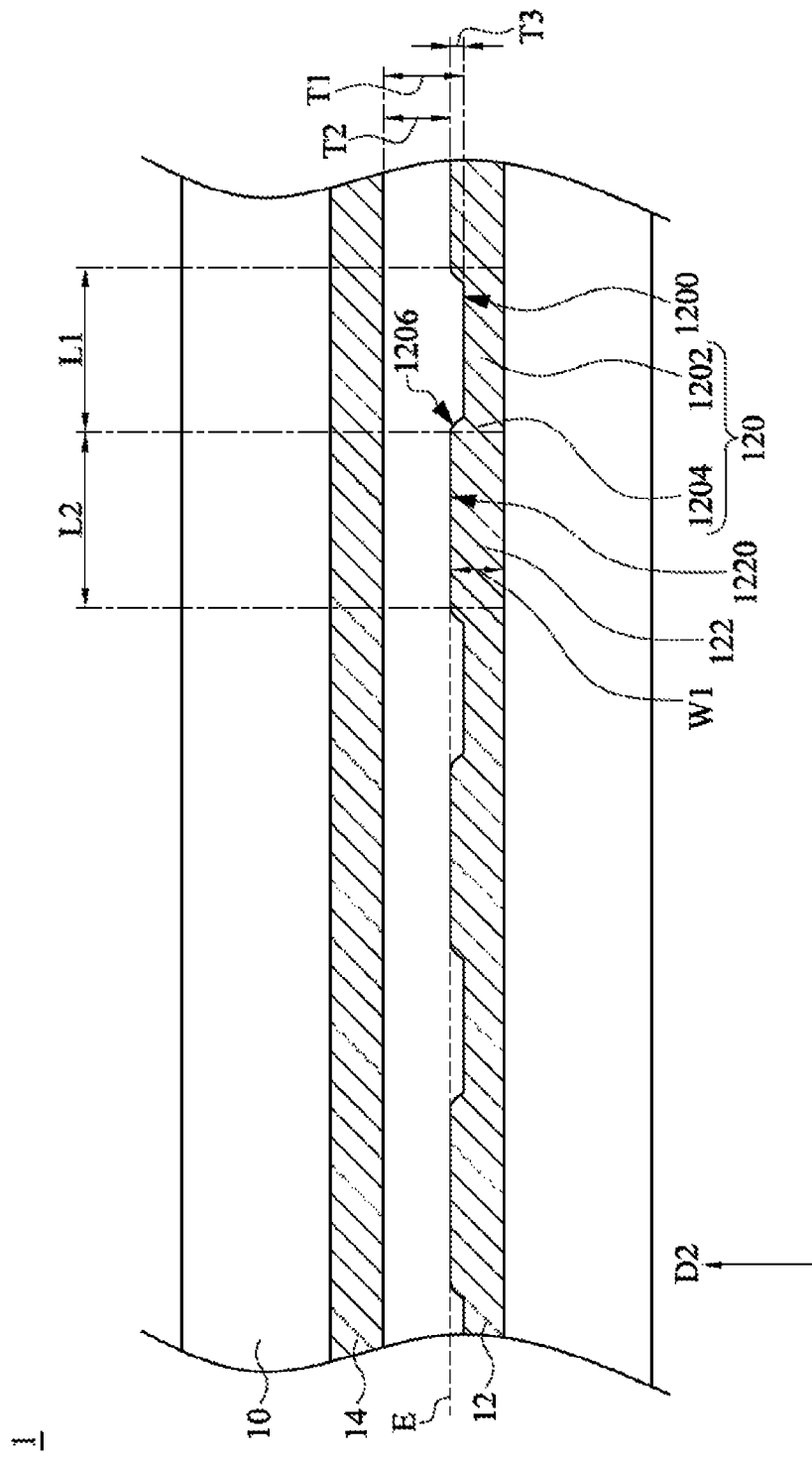
FIG. 1 is a top view of a signal transmission assembly according to an embodiment of the disclosure.

Referring to FIG. 1, FIG. 1 is a top view of a signal transmission assembly 1 according to an embodiment of the disclosure. As shown in FIG. 1, in this embodiment, the signal transmission assembly 1 includes a substrate 10, a first transmission line 12, and a second transmission line 14. In an embodiment, the first transmission line 12 and the second transmission line 14 are respectively disposed on the substrate 10. In addition, the first transmission line 12 extends along a first direction D1 and transmits a signal, and the second transmission line 14 also extends along a first direction D1 and transmits a signal. A second direction D2 defined in this embodiment is essentially orthogonal to the first direction D1. In other embodiments, the second direction D2 non-orthogonally intersects with the first direction D1.

As shown in FIG. 1, the first transmission line 12 includes a plurality of first transmission section 120 and a plurality of second transmission section 122, and the first transmission sections 120 and the second transmission sections 122 are arranged alternately along the first direction D1. In this embodiment, the first transmission section 120 has a first length L1 in the first direction D1, and the first transmission section 120 further includes a body portion 1202 and a buffer portion 1204. In this embodiment, the body portion 1202 of the first transmission section 120 is connected to the second transmission section 122 by the buffer portion 1204.

In this embodiment, the second transmission section 122 has a second length L2 in the first direction D1 and further has a first width W1 in the second direction D2. The second length L2 of the second transmission section 122 is the same as the first length L1 of the first transmission section 120. In other embodiments, the second length L2 of the second transmission section 122 is different from the first length L1 of the first transmission section 120. In an embodiment, the first length L1 of the first transmission section 120 is at least two times the second length L2 of the second transmission section 122.

As shown in FIG. 1, a first edge 1200 of the body portion 1202 of the first transmission section 120 is proximal to the second transmission line 14 and parallel to the first direction D1. A second edge 1220 of the second transmission section 122 is proximal to the second transmission line 14 and parallel to the first direction D1. The distance between the first edge 1200 of the first transmission section 120 and the second transmission line 14 is greater than the distance between the second edge 1220 of the second transmission section 122 and the second transmission line 14. The second transmission line 14 is not in contact with an edge extension line E extending from the second edge 1220 along the first direction D1. In addition, a curved edge 1206 of the buffer portion 1204 of the first transmission section 120 is proximal to the second transmission line 14, and the curved edge 1206 is connected between the first edge 1200 of the body portion 1202 and the second edge 1220 of the second transmission section 122. Moreover, the curved edge 1206 is smoothly connected to the second edge 1220.

Usually, when a transmission line includes an unsmooth structure, impedance in transmission line is discontinuous. Consequently, when a signal is transferred in the transmission line, partial energy of the signal is reflected to a source of the signal to cause interference on signal transmission. However, in this embodiment, an impedance variation from the body portion 1202 of the first transmission section 120 to the second transmission section 122 is a continuous variation because the buffer portion 1204 is smoothly connected between the first edge 1200 and the second edge 1220, thereby avoiding impedance discontinuity in the first transmission line 12. Therefore, the buffer portion 1204 of this embodiment avoids reflection of a signal, thereby reducing a probability that signal transmission is interfered.

Furthermore, the first transmission section 120 has a side which is proximal to the second transmission line 14 and the side of the first transmission section 120 has a cave away from the second transmission line 14. Specifically, in the second direction D2, the first transmission section 120 of the first transmission line 12 is apart from the second transmission line 14 by a first distance T1, and the second transmission section 122 of the first transmission line 12 is apart from the second transmission line 14 by a second distance T2. In this embodiment, the first distance T1 is greater than the second distance T2. In an embodiment, the first distance T1 is equal to the second distance T2. In an embodiment, the second distance T2 is at least 1.5 times the first width W1 of the second transmission section 122. In an embodiment, in the second direction D2, a third distance T3 is between the first edge 1200 of the first transmission section 120 and the second edge 1220 of the second transmission section 122. The first width W1 of the second transmission section 122 is less than four times the third distance T3. That is, the depth of the cave of the first transmission section 120 is at least a quarter of the first width W1 of the second transmission section 122.

In this embodiment, the second transmission sections 122 and the first transmission sections 120 are alternately arranged along the first direction D1, so that the distance between the first transmission line 12 and the second transmission line 14 periodically varies. There is a relatively large distance between the first transmission section 120 of the first transmission line 12 and the second transmission line 14, so as to reduce the voltage coupling or the current coupling between the first transmission line 12 and the second transmission line 14, thereby preventing a crosstalk phenomenon occurring between the transmission lines. In addition, the first length L1 of the first transmission section 120 of the first transmission line 12 is less than one twentieth of a wavelength of a transmitted signal, so that impedance of the first transmission line 12 is the same as that of the second transmission line 14. Therefore, the impedance of the first transmission line 12 is maintained while preventing a crosstalk phenomenon occurring between the transmission lines.

The substrate 10 of this embodiment includes any insulation material. In an embodiment, the material of the substrate 10 includes polyimide resin, bis-maleimide triazine (BT) resin, or a fire-retardant epoxy resin-glass cloth laminate material (FR-4), but the disclosure is not limited to the foregoing materials. Materials of the first transmission line 12 and the second transmission line 14 of this embodiment include copper (Cu), aluminum (Al), gold (Au), silver (Ag), tin (Sn), nickel (Ni), lead (Pb), any combination of the foregoing materials, or any other suitable conductive material. In addition, the first transmission line 12 and the second transmission line 14 are attached to the substrate 10 in any manner, including using an adhesive material (such as epoxy resin) by means of a lamination process or any suitable manner known by any person skilled in the art.

Figure 2:
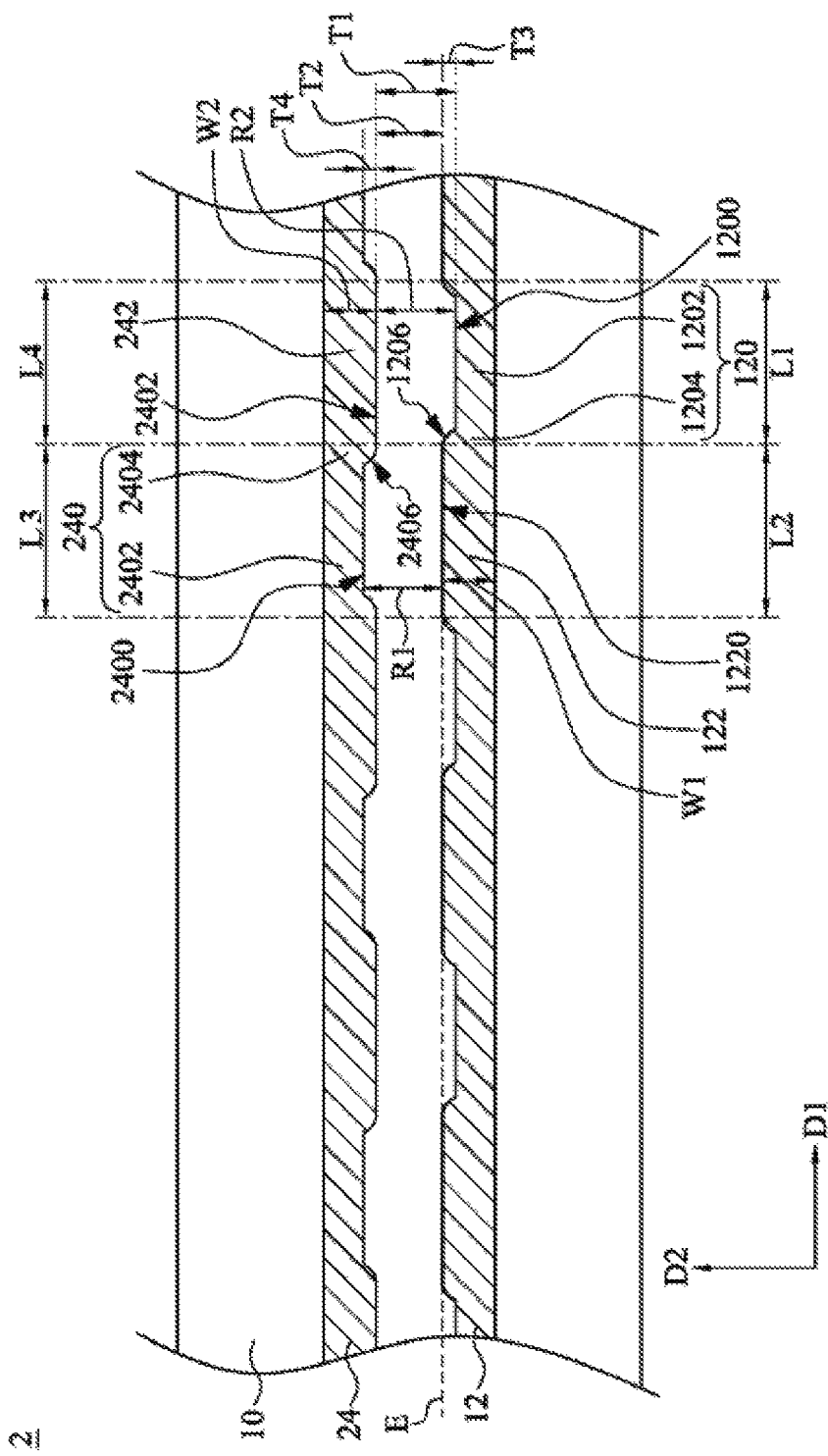
FIG. 2 is a top view of a signal transmission assembly according to another embodiment of the disclosure.

Referring to FIG. 2, FIG. 2 is a top view of a signal transmission assembly 2 according to another embodiment of the disclosure. As shown in FIG. 2, in this embodiment, structures, functions, and connection relationships of a substrate 10, a first transmission line 12, and a second transmission line 24 included by the signal transmission assembly 2 are approximately the same as those of the signal transmission assembly 1 shown in FIG. 1. Details are not described herein again. It should be noted herein that a difference between this embodiment and the embodiment shown in FIG. 1 is that in this embodiment, the second transmission line 24 further includes a plurality of third transmission section 240 and a plurality of fourth transmission section 242. Therefore, in this embodiment the second transmission line 14 shown in FIG. 1 is replaced with the second transmission line 24.

In this embodiment, in the second direction D2, the third transmission sections 240 of the second transmission line 24 is disposed corresponding to the second transmission sections 122 of the first transmission line 12. The fourth transmission sections 242 of the second transmission line 24 is disposed corresponding to the first transmission sections 120 of the first transmission line 12.

Specifically, the third transmission section 240 of the second transmission line 24 has a third length L3 in the first direction D1 and further includes a body portion 2402 and a buffer portion 2404. In this embodiment, the third length L3 of the third transmission section 240 is less than one twentieth of a wavelength of a transmitted signal. The body portion 2402 of the third transmission section 240 is connected to the fourth transmission section 242 by the buffer portion 2404. In addition, in this embodiment, the fourth transmission section 242 of the second transmission line 24 has a fourth length L4 in the first direction D1 and further has a second width W2 in the second direction D2. The fourth length L4 of the fourth transmission section 242 is the same as the third length L3 of the third transmission section 240, but the disclosure is not limited to the structural configuration.

In this embodiment, the first length L1 of the first transmission section 120, the second length L2 of the second transmission section 122, the third length L3 of the third transmission section 240, and the fourth length L4 of the fourth transmission section 242 are the same as each other. In other embodiments, the first length L1 of the first transmission section 120 is the same as the fourth length L4 of the fourth transmission section 242, the second length L2 of the second transmission section 122 is the same as the third length L3 of the third transmission section 240, but the first length L1 of the first transmission section 120 is different from the second length L2 of the second transmission section 122.

In this embodiment, the second width W2 of the fourth transmission section 242 of the second transmission line 24 is the same as the first width W1 of the second transmission section 122 of the first transmission line 12. In other embodiments, the second width W2 of the fourth transmission section 242 of the second transmission line 24 is different from the first width W1 of the second transmission section 122 of the first transmission line 12.

As shown in FIG. 2, the third transmission section 240 has a side which is proximal to the first transmission line 12 and the side of the third transmission section 240 has a cave away from the first transmission line 12. Specifically, in the second direction D2, the first transmission section 120 of the first transmission line 12 is apart from the fourth transmission line 242 of the second transmission line 24 by a first distance T1, and the shortest distance between the first transmission line 12 and the second transmission line 24 is a second distance T2. In this embodiment, the first distance T1 is greater than the second distance T2. The second distance T2 is at least 1.5 times the second width W2 of the fourth transmission section 242.

In addition, in the second direction D2, the body portion 2402 of the third transmission section 240 of the second transmission line 24 is apart from the second transmission section 122 of the first transmission line 12 by a distance R1, and the fourth transmission section 242 of the second transmission line 24 is apart from the body portion 1202 of the first transmission section 120 of the first transmission line 12 by a distance R2. In this embodiment, the distance R1 is the same as the distance R2, therefore the distance between the first transmission line 12 and the second transmission line 24 remains the same, to reduce the voltage coupling or the current coupling between the first transmission line 12 and the second transmission line 14. In other embodiments, the distance R1 is different from the distance R2.

In this embodiment, a first edge 2400 of the body portion 2402 of the third transmission section 240 is proximal to the first transmission line 12 and parallel to the first direction D1. The buffer portion 2404 of the third transmission section 240 includes a curved edge 2406 which is proximal to the first transmission line 12. A second edge 2420 of the fourth transmission section 242 is proximal to the first transmission line 12 and parallel to the first direction D1, and the curved edge 2406 is connected between the first edge 2400 of the body portion 2402 and the second edge 2420 of the fourth transmission section 242. Moreover, the curved edge 2406 is smoothly connected to the second edge 2420.

In this embodiment, a fourth distance T4 is between the first edge 2400 of the third transmission section 240 and the second edge 2420 of the fourth transmission section 242. The second width W2 of the fourth transmission section 242 is less than four times the fourth distance T4. In this embodiment, the fourth distance T4 in the second transmission line 24 is the same as the third distance T3 in the first transmission line 12, but the disclosure is not limited thereto. In other embodiments, the fourth distance T4 is different from the third distance T3.

In addition, the second transmission sections 122 of the first transmission line 12 and the first transmission sections 120 of the first transmission line 12 are alternately arranged along the first direction D1, and the fourth transmission sections 242 and the third transmission sections 240 of the second transmission line 24 are also alternately arranged along the first direction D1, so that the distance between the first transmission line 12 and the second transmission line 24 is increased to reduce the voltage coupling or the current coupling between the first transmission line 12 and the second transmission line 14, thereby preventing a crosstalk phenomenon occurring between the transmission lines.

Figure 3:
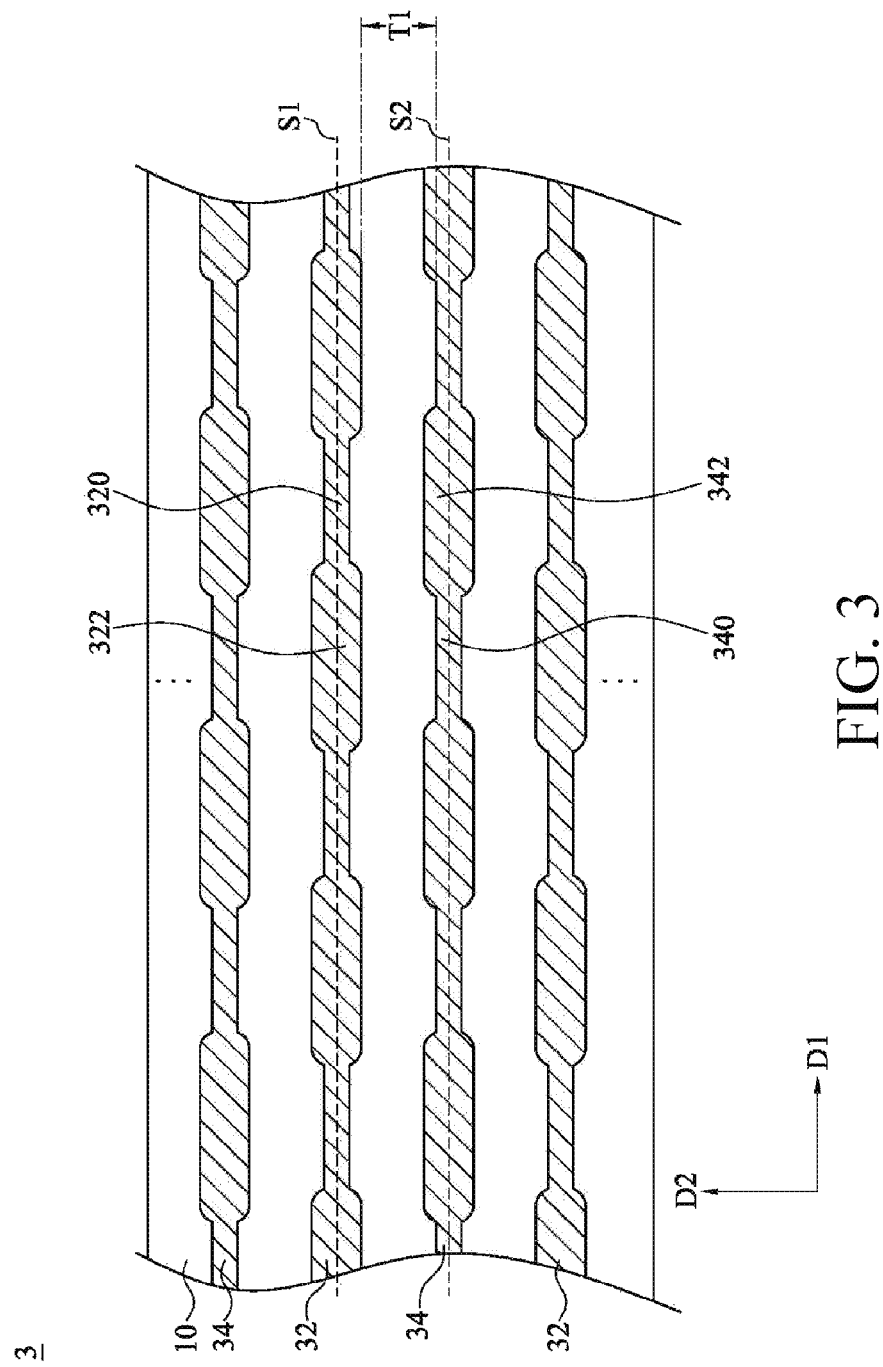
FIG. 3 is a top view of a signal transmission assembly according to still another embodiment of the disclosure.

Referring to FIG. 3, FIG. 3 is a top view of a signal transmission assembly 3 according to still another embodiment of the disclosure. As shown in FIG. 3, in this embodiment, structures, functions, and connection relationships of a substrate 10, a first transmission line 32, and a second transmission line 34 included by the signal transmission assembly 3 are approximately the same as those of the signal transmission assembly 2 shown in FIG. 2. Details are not described herein again.

It should be noted herein that a difference between this embodiment and the embodiment shown in FIG. 2 is that in this embodiment, the first transmission line 32 has a first symmetry axis S1 extending along the first direction D1 and the second transmission line 34 also has a second symmetry axis S2 extending along the first direction D1. An overall structure of the first transmission line 32 is symmetric based on the first symmetry axis S1, so that the two opposite side of the first transmission sections 320 of the first transmission line 32 respectively have a cave dented toward the first symmetry axis S1.

Similarly, an overall structure of the second transmission line 34 is symmetric based on the second symmetry axis S2, so that the two opposite side of the third transmission sections 340 of the second transmission line 34 respectively have a cave dented toward the second symmetry axis S2.

In addition, in this embodiment, the first transmission lines 32 and the second transmission lines 34 are alternately arranged along the second direction D2 on the substrate 10, so that the distance between a first transmission line 32 and a second transmission line 34 is increased to reduce the voltage coupling or the current coupling between the first transmission line 32 and the second transmission line 34, thereby preventing a crosstalk phenomenon occurring between the transmission lines.

It could be obviously learned from the foregoing detailed descriptions of the disclosure, each of the first transmission section of the first transmission line has a side which is proximal to the second transmission line 14 and the side of the first transmission section has a cave away from the second transmission line or each of the third transmission sections of the second transmission line has a side which is proximal to the first transmission line and the side of the third transmission section has a cave away from the first transmission line, so that the distance between the first transmission line and the second transmission line is increased to reduce the voltage coupling or the current coupling between the first transmission line and the second transmission line, thereby reducing crosstalk phenomena between the transmission lines.

Further, in an embodiment, in the first transmission line, an impedance variation from the body portion of the first transmission section to the second transmission section is a continuous variation because of the buffer portion, thereby avoiding impedance discontinuity in the first transmission line. Therefore, the buffer portion of this embodiment can avoid reflection of a signal, thereby reducing a probability that signal transmission is interfered.

Features in the foregoing plurality of embodiments enable a person of ordinary skill in the art to understand respective aspects of the disclosure better. It should be learned by a person of ordinary skill in the art that to achieve same objectives and/or advantages the same as those of the embodiments mentioned in the disclosure, the disclosure can be easily used as a basis for further designing or modifying other processes or structures. It should also be learned by a person of ordinary skill in the art that the same structures do not depart from the spirit and scope of the disclosure, and can be changed, replaced, and modified in various ways without departing from the spirit and scope of the disclosure.

What is claimed is:

1. A signal transmission assembly, comprising:
    a substrate;

a first transmission line, disposed on the substrate, extending along a first direction, and comprising at least one first transmission section and at least one second transmission section, wherein the first transmission section has a first width in a second direction that intersects the first direction, the second transmission section has a second width in the second direction, and the second width of the second transmission section is different from the first width of the first transmission section; and a second transmission line, disposed on the substrate, and extending along the first direction, wherein the first transmission section is apart from the second transmission line by a first distance, the second transmission section is apart from the second transmission line by a second distance, and the first distance is greater than or equal to the second distance, wherein a first edge of the first transmission section is proximal to the second transmission line and parallel to the first direction, and a second edge of the second transmission section is also proximal to the second transmission line and parallel to the first direction, and the second transmission line is not in contact with an edge extension line extending from the second edge along the first direction.

2. The signal transmission assembly according to claim 1, wherein the second transmission section has a width in a second direction, and the second distance is at least 1.5 times the width.

3. The signal transmission assembly according to claim 1, wherein the second transmission section of the first transmission is with a width in a second direction, and the width is less than four times a distance between the first edge and the second edge.

4. The signal transmission assembly according to claim 1, wherein the second transmission line comprises at least one third transmission section and at least one fourth transmission section, the third transmission section has a side proximal to the first transmission line and the side of the third transmission section has a cave away from the first transmission line, and in the second direction, the third transmission section is disposed corresponding to the second transmission section, the fourth transmission section is disposed corresponding to the first transmission section.

5. The signal transmission assembly according to claim 4, wherein in the second direction, the first transmission section of the first transmission line is apart from the fourth transmission section of the second transmission line by the first distance, and the second transmission section of the first transmission line is apart from the fourth transmission section of the second transmission line by the second distance, and the first distance is greater than or equal to the second distance.

6. The signal transmission assembly according to claim 1, wherein the first transmission line has a first symmetry axis extending along the first direction and the second transmission line has a second symmetry axis extending along the first direction, and structures of the first transmission line and the second transmission line are respectively symmetric based on the first symmetry axis and the second symmetry axis.

7. The signal transmission assembly according to claim 1, wherein the first transmission section has a first length in the first direction to transmit a signal, and the first length of the first transmission section is less than one twentieth of a wavelength of the signal.

8. The signal transmission assembly according to claim 1, wherein the first transmission section has a first length in the first direction and the second transmission section has a second length in the first direction, and the second length of the second transmission section is the same as the first length of the first transmission section.

9. The signal transmission assembly according to claim 1, wherein the first transmission section further comprises a buffer portion and a body portion, the body portion is connected with the second transmission section by the buffer portion, the first edge of the body portion is proximal to the second transmission line and parallel to the first direction, the second edge of the second transmission section is proximal to the second transmission line and parallel to the first direction, and the buffer portion is with a curved edge which proximal to the second transmission line, and the curved edge is connected between the first edge and the second edge.

10. The signal transmission assembly according to claim 1, wherein the first transmission sections and the second transmission sections are arranged alternately along the first direction.

11. A signal transmission assembly, comprising:
a substrate;
a first transmission line, disposed on the substrate, extending along a first direction, and comprising at least one first transmission section and at least one second transmission section; and
a second transmission line, disposed on the substrate, extending along the first direction, and comprising at least one third transmission section and at least one fourth transmission section, wherein the third transmission section has a side proximal to the first transmission line and the side of the third transmission section has a cave away from the first transmission line, and in the second direction, the third transmission section is disposed corresponding to the second transmission section, the fourth transmission section is disposed corresponding to the first transmission section,
wherein the first transmission section is apart from the second transmission line by a first distance, the second transmission section is apart from the second transmission line by a second distance, and the first distance is greater than or equal to the second distance, and
wherein a first edge of the first transmission section is proximal to the second transmission line and parallel to the first direction, and a second edge of the second transmission section is also proximal to the second transmission line and parallel to the first direction, and the second transmission line is not in contact with an edge extension line extending from the second edge along the first direction.

12. A signal transmission assembly, comprising:
a substrate;
a first transmission line, disposed on the substrate, extending along a first direction, and comprising at least one first transmission section and at least one second transmission section, wherein the first transmission section comprises a buffer portion and a body portion, and the body portion is connected with the second transmission section by the buffer portion; and
a second transmission line, disposed on the substrate, and extending along the first direction, wherein the first transmission section is apart from the second transmission line by a first distance, the second transmission section is apart from the second transmission line by a second distance, and the first distance is greater than or equal to the second distance, wherein a first edge of body portion of the first transmission section is proximal to the second transmission line and parallel to the first direction, the buffer portion of the first transmission section is with a curved edge which proximal to the second transmission line, the curved edge is connected between the first edge and the second edge, a second edge of the second transmission section is proximal to the second transmission line and parallel to the first direction, and the second transmission line is not in contact with an edge extension line extending from the second edge along the first direction.

* * * * *